(12) United States Patent
Liu et al.

(10) Patent No.: US 11,975,808 B2
(45) Date of Patent: May 7, 2024

(54) AUTOMATIC STABLE POSTURE SEABED BASE AND RELEASING METHOD

(71) Applicant: College of Ocean Science and Engineering, Shandong University of Science and Technology, Qingdao (CN)

(72) Inventors: Yong Liu, Qingdao (CN); Yongzhi Wang, Qingdao (CN); Honghua Shi, Qingdao (CN); Weimin Zheng, Qingdao (CN)

(73) Assignee: College of Ocean Science and Engineering, Shandong University of Science and Technology, Qingdao (CN)

( * ) Notice: Subject to any disclaimer, the term of this patent is extended or adjusted under 35 U.S.C. 154(b) by 0 days.

(21) Appl. No.: 18/124,062

(22) Filed: Mar. 21, 2023

(65) Prior Publication Data
US 2023/0331360 A1    Oct. 19, 2023

(30) Foreign Application Priority Data
Apr. 19, 2022    (CN) .......................... 202210409852.0

(51) Int. Cl.
*B63C 11/52*    (2006.01)
*G01C 13/00*    (2006.01)

(52) U.S. Cl.
CPC .............. *B63C 11/52* (2013.01); *G01C 13/00* (2013.01)

(58) Field of Classification Search
CPC ......... B63C 11/00; B63C 11/52; G01C 13/00; B63B 22/00; B63B 22/18; B63B 22/20

USPC .......................................................... 114/312
See application file for complete search history.

(56) References Cited

U.S. PATENT DOCUMENTS

| 4,191,049 | A | 3/1980 | Bowditch et al. | |
|---|---|---|---|---|
| 6,463,800 | B2 * | 10/2002 | Fowler | B63B 22/04 441/27 |
| 8,382,540 | B2 * | 2/2013 | Barnard | B63B 22/04 441/26 |

(Continued)

FOREIGN PATENT DOCUMENTS

| CN | 106841311 A | 6/2017 |
|---|---|---|
| CN | 207157469 A | 3/2018 |

(Continued)

*Primary Examiner* — Lars A Olson
(74) *Attorney, Agent, or Firm* — Rachel Pilloff; Sean Passino; Pilloff Passino & Cosenza LLP

(57) ABSTRACT

Disclosed are an automatic stable posture seabed base and a releasing method, belonging to the technical field of ocean observation. The automatic stable posture seabed base includes an accommodating body with an inner cavity for accommodating the first observation device and a seawater, and the accommodating body has first through holes for the seawater to enter and outflow the inner cavity; plugging members blocked at the first through holes to close or semi-close the first through holes; and a buoyancy body installed at a transducer of the first observation device, and a buoyancy of the buoyancy body is larger than a mass of the first observation device, so that the first observation device may float in the cover body after the cover body is filled with water, and a posture of the transducer in the cover body always keeps vertically to the sea surface.

8 Claims, 8 Drawing Sheets

(56) References Cited

U.S. PATENT DOCUMENTS

2015/0354956 A1   12/2015   Tian et al.

FOREIGN PATENT DOCUMENTS

| CN | 107991679 | A | 5/2018 |
| CN | 109212152 | A | 1/2019 |
| CN | 208453212 | U | 2/2019 |
| CN | 111846167 | A | 10/2020 |
| JP | 2007308078 | A | 11/2007 |

* cited by examiner

AUTOMATIC STABLE POSTURE SEABED BASE AND RELEASING METHOD

CROSS-REFERENCE TO RELATED APPLICATIONS

This application claims priority to Chinese Patent Application No. 202210409852.0, filed on Apr. 19, 2022, the contents of which are hereby incorporated by reference.

TECHNICAL FIELD

The application belongs to the technical field of ocean observation, and in particular relates to an automatic stable posture seabed base and a releasing method.

BACKGROUND

A seabed base is an integrated system for fixed-point and long-term monitoring of a marine environment, and the seabed base sits on seabed. A built-in ocean first observation device may continuously obtain hydrological factors such as ocean current profile, seabed temperature, seabed salinity, water depth, waves, etc. An advanced seabed base also has an underwater acoustic communication real-time data transmission technology, which is an important technical means to obtain long-term marine hydrological factors, and an indispensable data acquisition means in fields of marine engineering construction, marine environmental protection, marine disaster prevention and mitigation, etc.

At present, a releasing process of the seabed base is as follows: after the seabed base on board a ship reaches the observation sea area, the seabed base is generally released by a survey ship or a civilian ship at high tide and low tide (when a current is low). A releasing mode is mainly through a crane at sides of the ship or a stern of the survey ship, and the seabed base is released into the sea by hoisting a cable. When the seabed base reaches the seabed, the cable is no longer stressed, and then the cable may be reclaimed. After the seabed base is released, a posture may change due to effects of waves, currents and other factors during a descent process, as well as an influence of coastal currents and ship motions. A bottom of the seabed base may not be placed on the seabed smoothly due to an uncertainty of seabed topography. The posture of the seabed base is inclined or buckled after landing, so posture information after landing on the seabed may not be obtained by releasing personnel on a sea surface. The first observation device, such as acoustic doppler current profiler (ADCP) and AWAC (Acoustic Wave And Current), which are installed inside the seabed base and have requirements for the posture of the seabed base, may not keep a transducer perpendicular to the sea surface, resulting in an observation failure or a poor quality of observation data. This problem is particularly prominent in Bohai Sea, Yellow Sea and East China Sea. Because of a high turbidity in coastal waters of Bohai Sea, Yellow Sea and East China Sea, it is impossible to identify from the sea surface whether the bottom of the seabed base has landed smoothly or not, and an identification often depends on an experience and a feel from the releasing personnel. Sometimes, in order to ensure the bottom of the seabed base to land, the releasing personnel may slightly retract the cable after the seabed base reaches the seabed. However, the posture of the seabed base on the seabed may not be fully guaranteed to be placed on the seabed in a stable manner. If sea conditions are not ideal at the time of releasing, the posture of the seabed base may not be completely controlled even if the cable is lifted many times. A seabed base system is generally used for a long-term observation of the hydrological factors, providing important engineering design parameters for offshore marine engineering construction. Generally, the seabed base system needs to be placed on the seabed for one year or even longer. During this period, it is necessary to read data and replace batteries every 1-2 months, and the seabed base needs to be reclaimed and released every time. This work is repeated until an end of observation. If the posture of the seabed base is inappropriate once, a quality of the overall observation data may decrease, thus adversely affecting an acquisition of engineering construction parameters. If an investigation is carried out again, a cost of manpower and material resources may be increased and a construction period may be easily delayed. Therefore, the posture of the seabed base on the seabed plays a very important role in obtaining high-quality data. At present, there is no reliable technical means to ensure that the posture of the seabed base landing on the seabed after the release is good and stable.

SUMMARY

An objective of the application is to propose an automatic stable posture seabed base and a releasing method, ensuring that a transducer of a first observation device always keeps vertically to the sea surface. Moreover, its releasing method has less requirements for sea conditions and tide.

To achieve this objective, the application adopts a following technical scheme.

The automatic stable posture seabed base provided by the application includes: an accommodating body with an inner cavity for accommodating the first observation device and a seawater, and the accommodating body has first through holes for the seawater to enter and outflow the inner cavity; plugging members blocked at the first through holes to close or semi-close the first through holes; and a buoyancy body installed at a transducer of the first observation device, and a buoyancy of the buoyancy body is larger than a mass of the first observation device, so that the first observation device may float in the cover body after the cover body is filled with water, and a posture of the transducer in the cover body always keeps vertically to a sea surface.

In an embodiment, the buoyancy body includes two floating rings, and the two floating rings encircle an outer side wall of the transducer and are located at an upper part of the first observation device, and are fixed to the transducer by a first clamp.

In an embodiment, the accommodating body includes: a frame, and the frame has a plurality of limiters that may be telescopically adjusted; and a cover body limited and fixed in the frame by the plurality of limiters; and an inside of the cover body is provided with an inner cavity, and side walls of the cover body have the first through holes.

In an embodiment, the plugging members are threaded plugs or permeable plugs, and the first through holes are threaded holes matched with the plugging members.

In an embodiment, each permeable plug includes a plug cap and a plug body; an outer side of each plug body has a first external thread, each plug cap is screwed to each plug body through each first external thread, and each plug body is screwed to each first through hole through each first external thread; each plug body has a groove, and a side of each plug body with a distance from each plug cap and each plug cap are provided with at least one liquid passing hole; and each liquid passing hole is connected with each groove, and a sponge is arranged in each groove.

In an embodiment, the cover body includes a first hemispherical cover and a second hemispherical cover; an opening of the first hemispherical cover has a second external thread, and an opening of the second hemispherical cover has a first internal thread; the first hemispherical cover and the second hemispherical cover are screwed into a sphere through the first internal thread and the second external thread; a first rubber ring is arranged between the first hemispherical cover and the second hemispherical cover, and the first rubber ring is sleeved on an outer side of the second external thread, and a diameter of the cover body is 1.2-1.4 times a length of the first observation device; and the first hemispherical cover and the second hemispherical cover each have a first through hole.

In an embodiment, the frame is polyhedral, and a limiter is fixed at an inner side of each vertex of the frame; the limiters are arranged along diagonal directions of the frame; each limiter includes a first rod, a second rod, a threaded sleeve, a support pad, and a gasket; one end of each first rod is fixed on an inner side of each apex of the frame, and the other end of each first rod has a third external thread; one end of each second rod is screwed to each support pad, and the other end of each second rod has a fourth external thread; each third external thread is opposite to a thread direction of each fourth external thread, and two inner ends of each threaded sleeve have second internal threads which are respectively screwed with each third external thread and each fourth external thread; each first rod and each second rod are connected by each threaded sleeve, and an inner side of each support pad is a concave spherical surface, and each gasket is attached to an edge of each concave spherical surface.

In an embodiment, at least one mounting bar is fixed on the inner side of the frame, and a second clamp is screwed on the mounting bar, and a second observation device is fixed in the second clamp; the frame is connected with an acoustic releaser through a chain, and handrails are fixed on the frame, and counterweight lead blocks and sacrificial anodes are fixed on the frame through third clamps.

In an embodiment, second rubber rings are arranged between the plugging members and the first through holes, and the plugging members are made of acrylic or stainless steel; a bottom of the first observation device is provided with a third rubber ring, and the first observation device is an acoustic doppler current profiler or an acoustic wave and current (ADCP or AWAC); and each support pad is made of metal, the cover body is made of acrylic, and the second observation device is one or more of a Conductivity Temperature Depth meter, a water level meter and a turbidity meter.

The application also provides a releasing method of the automatic stable posture seabed base, including following steps: S1, selecting the plugging members according to a releasing depth, and completing an assembly of the automatic stable posture seabed base; selecting the threaded plugs as the plugging members when the releasing depth is ≤30 m, and selecting the permeable plugs as the plugging members when the releasing depth is >30 m; and S2, selecting a releasing mode for releasing into the sea. When a rope is used for the releasing into the sea: the inner cavity is filled with water when the releasing depth is ≤30 m, and then chlorine tablets are put in, and the inner cavity without bubbles is required; then, the rope is connected with the accommodating body, the automatic stable posture seabed base is moved out of either side of a ship, the rope is slowly released, and the automatic stable posture seabed base descends to the seabed under gravity; a tension of the rope decreases instantly when the automatic stable posture seabed base lands on the seabed, and then the rope is retracted to complete the releasing; when the releasing depth is >30 m, the rope is connected with the accommodating body, the automatic stable posture seabed base is moved to either outside of the ship, and the rope is slowly released, and the automatic stable posture seabed base descends; after the seawater submerges the inner cavity and stays for a while, the seawater enters the inner cavity; after the inner cavity is full of seawater, the rope is slowly loosed until the automatic stable posture seabed base lands on the seabed, and the tension of the rope decreases instantly, and then the rope is retracted to complete the releasing; when throwing is used for the releasing into the sea: the inner cavity is filled with water when the releasing depth is ≤30 m, and then the chlorine tablets are put in, and the inner cavity without bubbles is required; the automatic stable posture seabed base is moved to the outside of the rails of the ship, and then pushed into the sea, and the automatic stable posture seabed base falls to the seabed under gravity to complete the releasing; when the releasing depth is >30 m, the rope is connected with the accommodating body, the automatic stable posture seabed base is moved to either outside of the ship, and the rope is slowly released, and the automatic stable posture seabed base descends; after the seawater submerges the inner cavity and stays for a while, the seawater enters the inner cavity; the rope is loosed after the inner cavity is full of the seawater, and the automatic stable posture seabed base falls to the seabed under the action of gravity, and the releasing is completed.

The application has following beneficial effects.

Firstly, no matter what posture the automatic stable posture seabed base lands on the seabed surface, the transducers of the core device ADCP or AWAC inside always keeps vertically to the sea surface, thus ensuring a quality of data acquisition.

Secondly, different plugging members are selected according to different releasing depths, so as to make the transducers always vertically face the sea surface.

Thirdly, through a setting of the limiters, the lengths of the limiters and tightness of the support pads combined with the cover body may be adjusted only by rotating the threaded sleeves. The limiters are used to install and limit the cover body, keep the cover body at a center of the frame, and are applicable to the cover body with different specifications. On the contrary, the cover body may be taken out by loosening the threaded sleeves.

Fourthly, since the posture of the automatic stable posture seabed base does not need to be taken into account, the seabed base may be towed and released by the rope or thrown from the ship, so the problems that the ship needs to be equipped with a high-powered crane in general seabed base releasing, and the seabed base needs to be lowered slowly all the time are solved. Therefore, the requirements for releasing ships are reduced, and a workload of seabed base releasing personnel is also reduced.

Fifthly, the requirements for sea conditions and tide time are decreased during the releasing with the setting of the automatic stable posture seabed base, and the automatic stable posture seabed base may be released under bad sea conditions. The conventional seabed base generally needs to be released at high flat tide or low flat tide. The automatic stable posture seabed base may be released without considering the influence of tidal time because of an automatic recovery of the posture, thus saving investigation time.

DETAILED DESCRIPTION OF THE EMBODIMENTS

Now, the application may be further explained with reference to drawings and detailed descriptions.

What is not described in detail in this specification belongs to the prior art known to those skilled in the art. In the description of the application, it should be understood that terms "center", "up", "down", "front", "back", "left", "right", "vertical", "horizontal", "top", "bottom", "inside", "outside", "clockwise", "counterclockwise", etc., indicate orientation or position relationships based on the drawings, and these terms are only for a convenience of describing the application and simplifying the description, rather than indicating or implying that a device or an element referred to must have a specific orientation, be constructed and operate in a specific orientation, so these terms may not be understood as a limitation of the application. In addition, the terms "first", "second" and "third" are only used to distinguish descriptions, and may not be understood as indicating or implying a relative importance.

Figure 1:
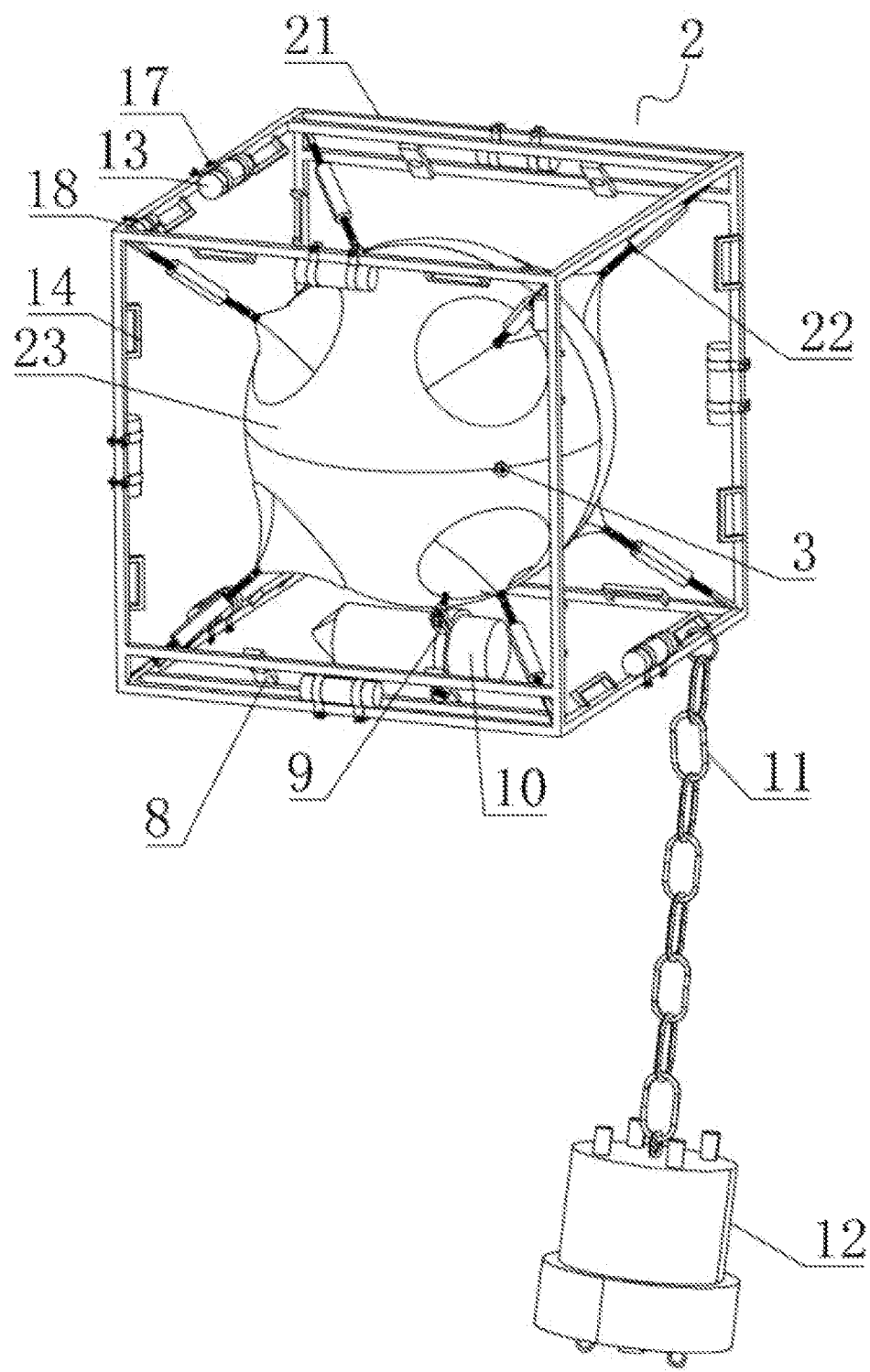
FIG. 1 is a schematic diagram of a three-dimensional structure according to application.
Figure 2:
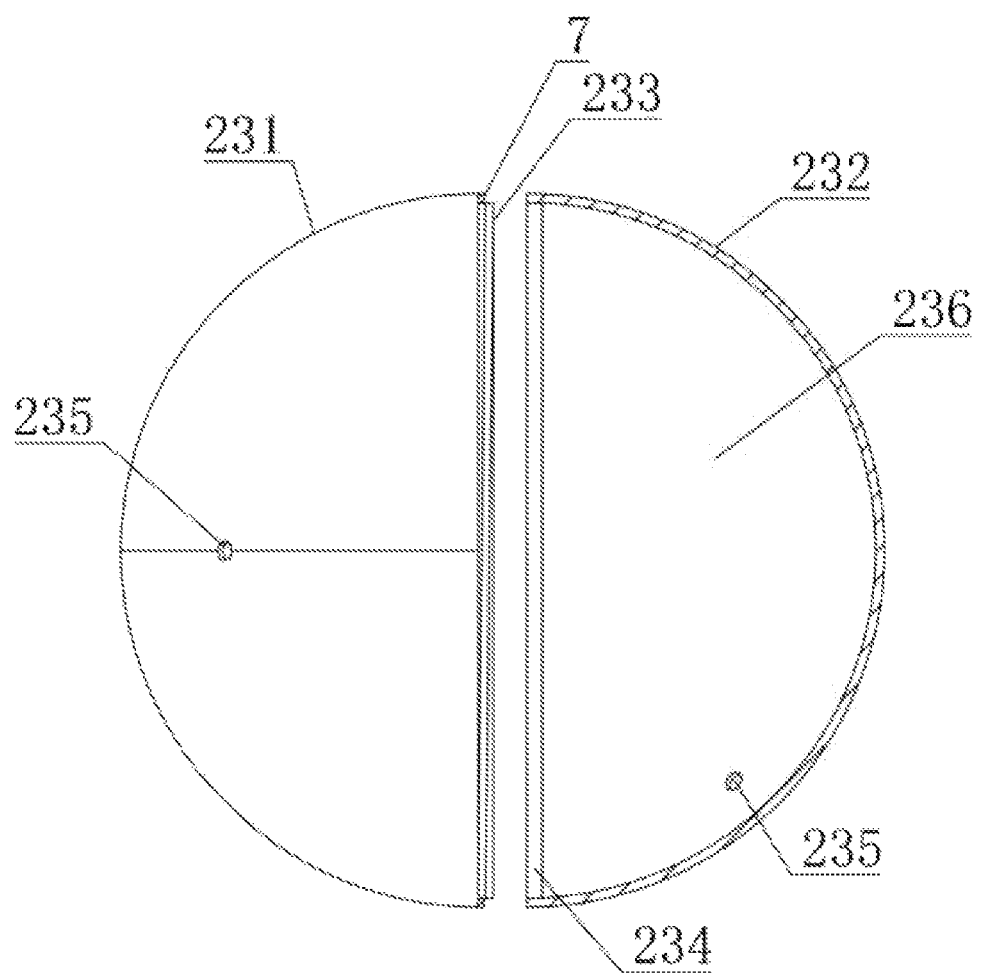
FIG. 2 is a schematic diagram of a mating structure of a cover body and a first rubber ring according to the application.
Figure 3:
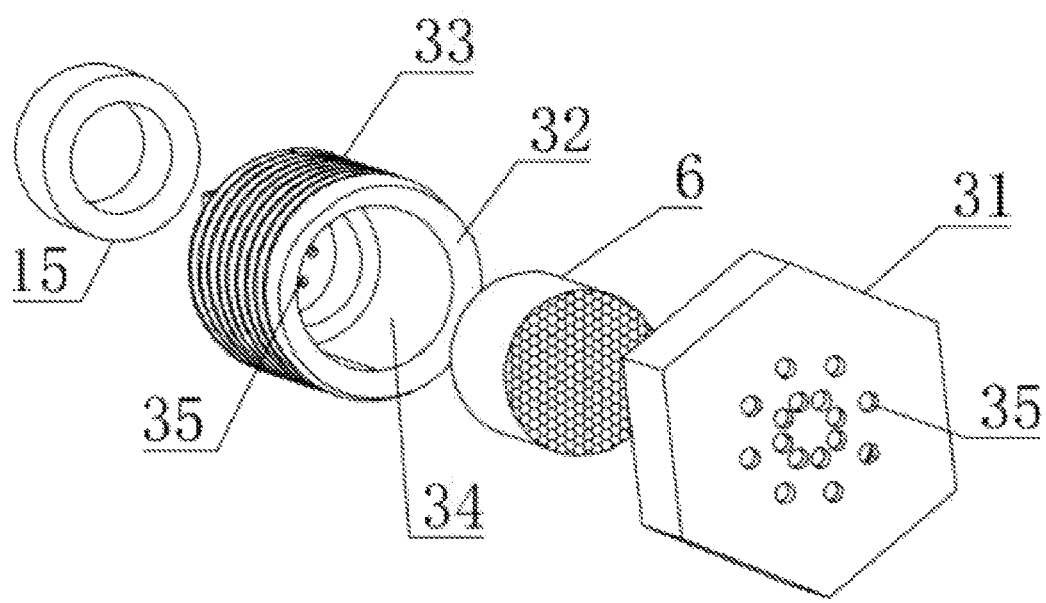
FIG. 3 is a schematic diagram of a three-dimensional structure of a permeable plug and a second rubber ring according to the application.
Figure 4:
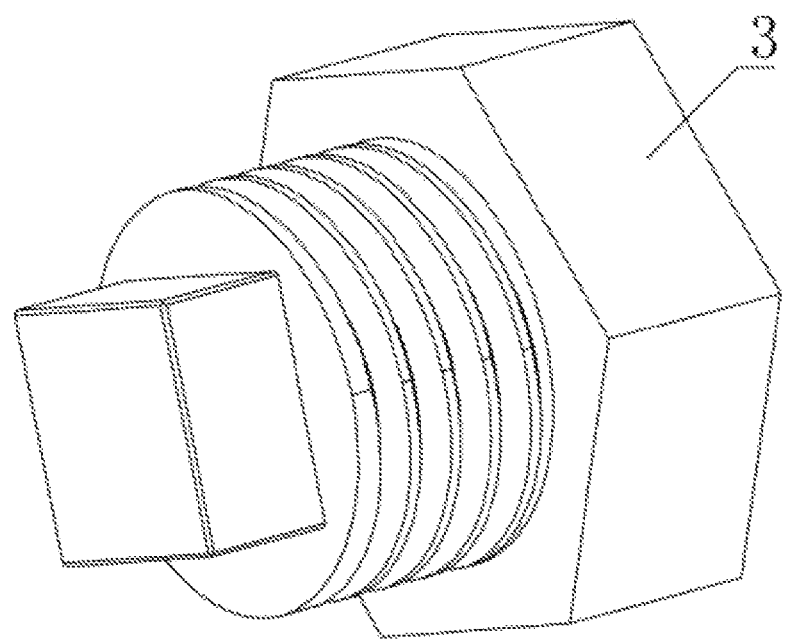
FIG. 4 is a schematic diagram of a three-dimensional structure of a threaded plug according to the application.
Figure 5:
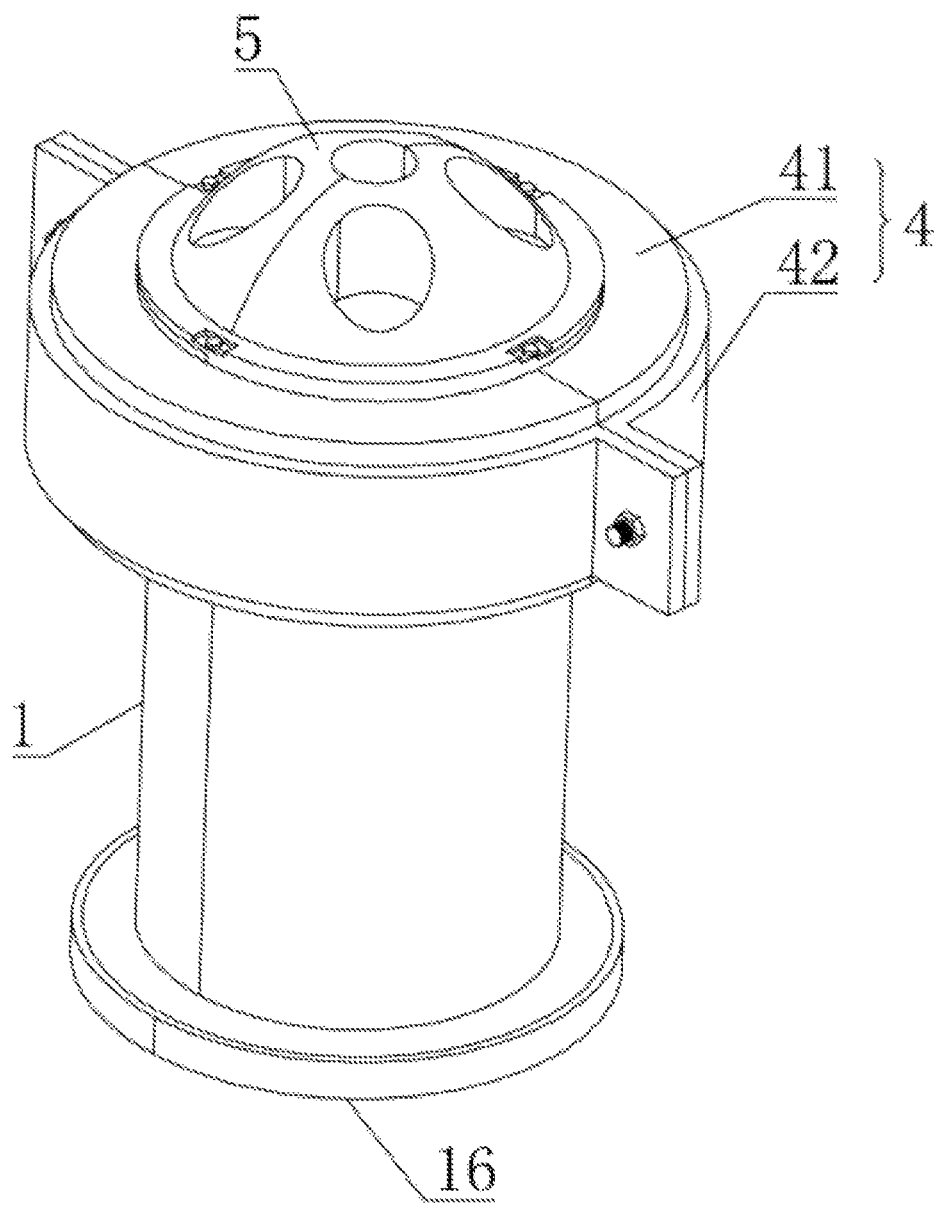
FIG. 5 is a schematic diagram of a three-dimensional structure of a first observation device, a transducer and a buoyancy body according to the application.
Figure 6:
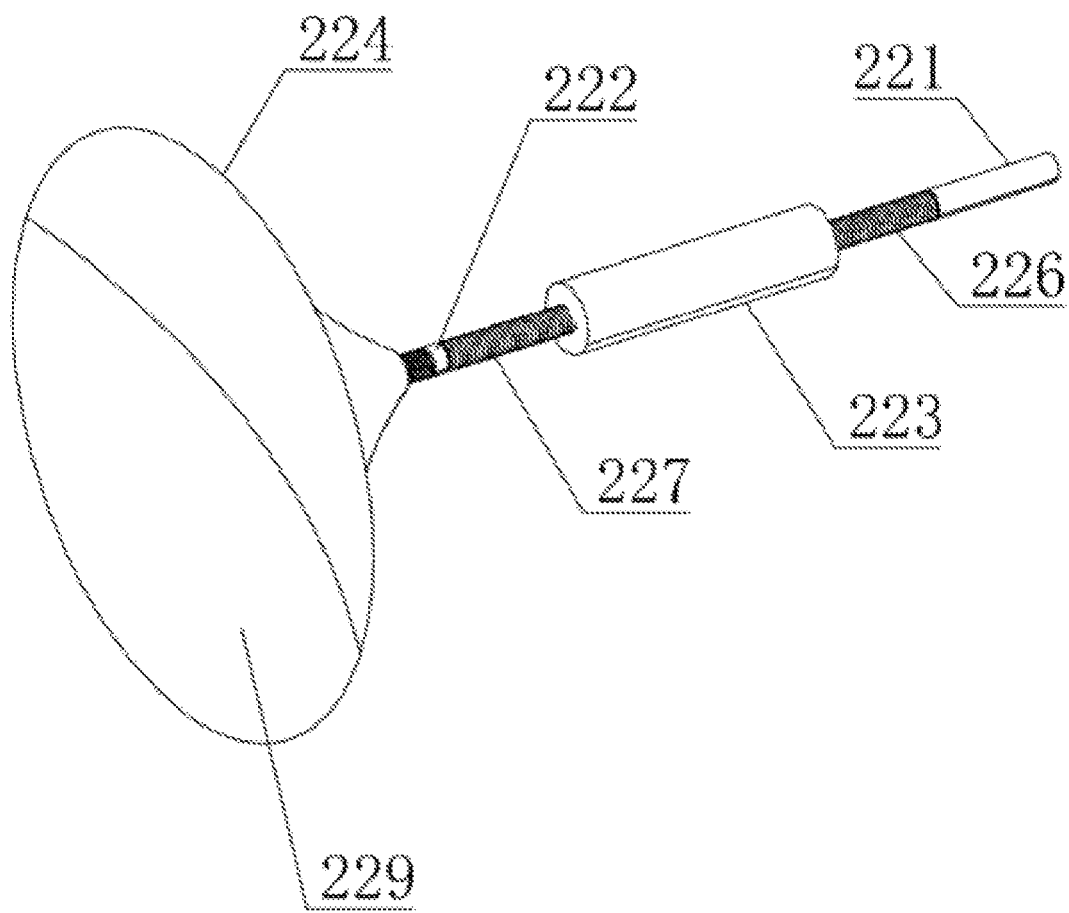
FIG. 6 is a schematic diagram of a three-dimensional structure of a limiter according to the application.
Figure 7:
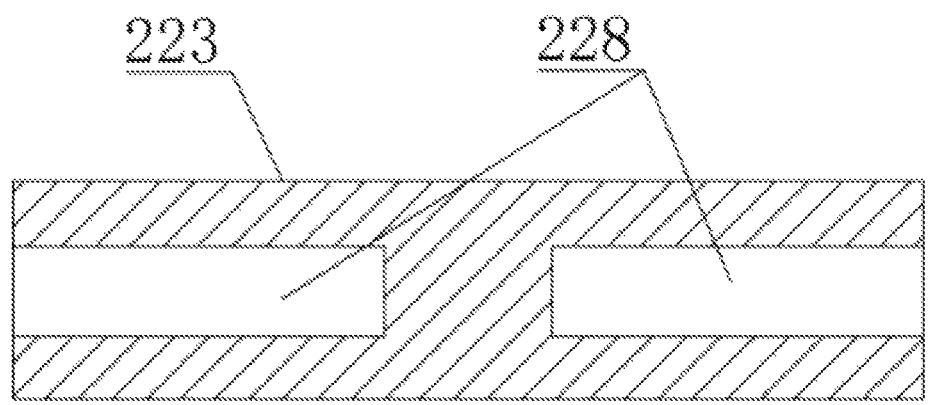
FIG. 7 is a schematic cross-sectional structure diagram of a threaded sleeve according to the application.
Figure 8:
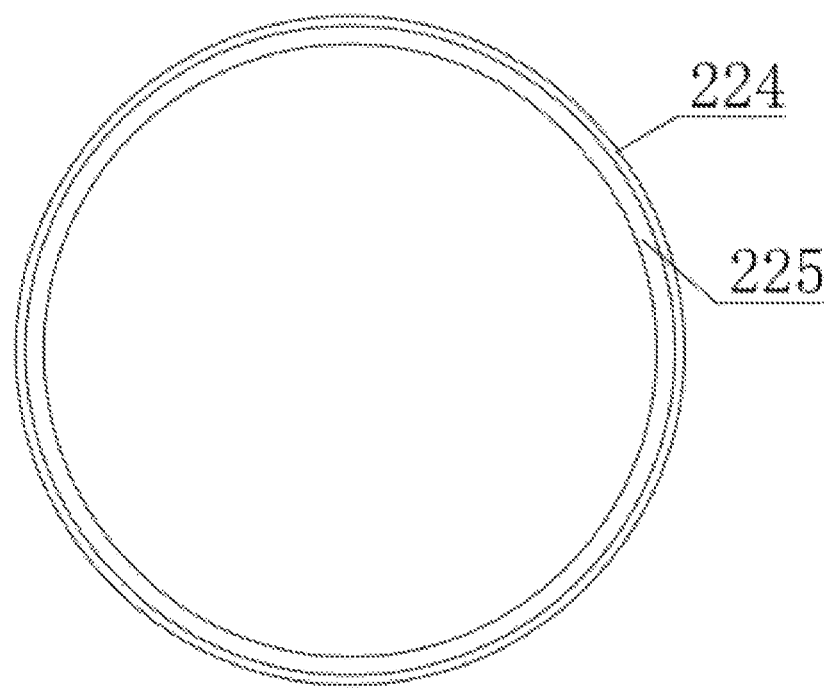
FIG. 8 is a schematic diagram of a mating structure of a support pad and a gasket according to the application.

As shown in FIGS. 1-8, an automatic stable posture seabed base provided in this embodiment includes an accommodating body 2, plugging members 3, a first observation device 1, and a buoyancy body 4. The accommodating body 2 has an inner cavity 236 for accommodating the first observation device 1 and a seawater, and the accommodating body 2 has first through holes 235 for the seawater to enter and outflow the inner cavity 236. The accommodating body 2 in this embodiment includes a frame 21, telescopic members, and a cover body 23. The frame 21 has eight limiters 22 that may be telescopically adjusted, and the cover body 23 is limited and fixed in the frame 21 by the eight limiters 22. An inside of the cover body 23 is provided with an inner cavity 236, and side walls of the cover body 23 have the first through holes 235. The plugging members 3 are blocked at the first through holes 235 to close or semi-close the first through holes 235, and the plugging members 3 are threaded plugs or permeable plugs, and the first through holes 235 are threaded holes matched with the plugging members 3. The plugging members 3 are selected according to a releasing depth, and the threaded plugs are suitable for shallow water with the depth of ≤30 m; the permeable plugs are suitable for deep water with the depth of >30 m. The plugs 3 are made of acrylic or stainless steel, and may be selected according to use requirements. Second rubber rings 15 are arranged between the plugging members 3 and the first through holes 235 to seal the first through holes 235. The buoyancy body 4 is installed at a transducer 5 of the first observation device 1, and a buoyancy of the buoyancy body 4 is larger than a mass of the first observation device 1, so that the first observation device 1 may float in the cover body 23 after the cover body 23 is filled with water, and a posture of the transducer 5 in the cover body 23 always keeps vertically to the sea surface.

Specifically, the frame 21 is in a shape of a regular hexahedron, and is welded by stainless steel pipes. A limiter 22 is fixed at an inner side of each vertex of the frame 21. The limiters 22 are arranged along diagonal directions of the frame 21. Each limiter 22 includes a first rod 221, a second rod 222, a threaded sleeve 223, a support pad 224, and a gasket 225. An outer end of each first rod 221 is fixed on an inner side of each apex of the frame 21, and an inner end of each first rod 221 has a third external thread 226; an inner end of each second rod 222 is screwed to each support pad 224, and each support pad 224 is made of metal; an outer end of each second rod 222 has a fourth external thread 227, each third external thread 226 is opposite to a thread direction of each fourth external thread 227, and two inner ends of each threaded sleeve 223 have second internal threads 228 which are respectively screwed with each third external thread 226 and each fourth external thread 227; each first rod 221 and each second rod 222 are connected by each threaded sleeve 223, and an inner side of each support pad 224 is a concave spherical surface 229, and each concave spherical surface 229 may fully fit with the cover body 23. Each gasket 225 is attached to an edge of each concave spherical surface 229. Each gasket 225 in this embodiment is made of rubber, thus increasing a friction between each support pad 224 and the cover body 23, while reducing a pressure of each metal support pad 224 on the cover body 23.

When the length of each limiter 22 needs to be adjusted, each threaded sleeve 223 is rotated. As each thread direction of each third external thread 226 is opposite to that of each fourth external thread 227, when each threaded sleeve 223 is rotated, each first rod 221 and each second rod 222 may be made close to each other or far away from each other according to a rotation direction, so as to adjust the length of each limiter 22 and tightness of each support pad 224 combined with the cover body 23. The limiters 22 are used to install and limit the cover body 23, keep the cover body 23 at a center of the frame 21, and are applicable to the cover body 23 with different specifications. On the contrary, the cover body may be taken out by loosening the threaded sleeves of the limiters.

Among them, the buoyancy body 4 includes two floating rings 41, and the two floating rings 41 encircle an outer side wall of the transducer 5 and are located at an upper part of the first observation device, and are fixed to the transducer 5 by a first clamp 42. The floating rings 41 of this embodiment are made of foam, specifically, lightweight synthetic composite microbead foam with a light weight and a high buoyancy. Because the buoyancy body 4 is arranged on the upper part of the first observation device, the transducer 5 may be kept vertically to the sea surface under the buoyancy of the floating rings 41.

Each permeable plug includes a plug cap 31 and a plug body 32; an outer side of each plug body 32 has a first external thread 33, each plug cap 31 is screwed to each plug body 32 through each first external thread 33, and each plug body 32 is screwed to each first through hole 235 through each first external thread 33; each plug body 32 has a groove 34, and a side of each plug body 32 with a distance from each plug cap 31 and each plug cap 31 are provided with at least one liquid passing hole 35; and each liquid passing hole 35 is connected with each groove 34, and a sponge 6 is arranged in each groove 34. Specifically, a number of turns of each first external thread 33 is larger than that of each internal thread of each plug cap 31, so that after each plug cap 31 is screwed into each plug body 32, the remaining first external thread 33 of each plug body 32 may be screwed into each first through hole 235. The sponges 6 are provided to filter suspended sand and microorganisms in the seawater. The liquid passing holes 35 are arranged to facilitate a circulation of seawater.

The cover body 23 includes a first hemispherical cover 231 and a second hemispherical cover 232; an opening of the first hemispherical cover 231 has a second external thread 233, and an opening of the second hemispherical cover 232 has a first internal thread 234; the first hemispherical cover 231 and the second hemispherical cover 232 are screwed into a sphere through the first internal thread 234 and the second external thread 233; and the first hemispherical cover 231 in this embodiment is located at a front side of the second hemispherical cover 232. A first rubber ring 7 is arranged between the first hemispherical cover 231 and the second hemispherical cover 232 to enhance a sealing performance of the cover body 23. The first rubber ring 7 is sleeved on an outer side of the second external thread 233, and a diameter of the cover body 23 is 1.2-1.4 times the length of the first observation device 1. The first hemispherical cover 231 and the second hemispherical cover 232 each have a first through hole 235, and the first through hole 235 of the first hemispherical cover 231 serves as a water inlet and is located above the first through hole 235 of the second hemispherical cover 232, and the first through hole 235 of the second hemispherical cover 232 serves as a water outlet. The cover body 23 is made of acrylic.

Among them, inner sides of the frame 21 are fixed by four mounting bars 8, which are divided into two groups, two in each group, and the two groups of mounting bars 8 are arranged diagonally. Besides the basic hexahedral frame 21 composed of twelve stainless steel pipes, the frame 21 also has one stainless steel pipe on every two adjacent faces for connecting the mounting bars 8, so that the mounting bars 8 are arranged obliquely. The mounting bars 8 are used to fix a second observation device 10, and may also connect a releaser. One mounting bar 8 is screwed with a second clamp 9, and the second clamp 9 is locked and fixed by nuts. The second observation device 10 is fixed in the second clamp 9, and the second observation device 10 is one or more of a temperature and salt depth meter, a tidal level meter and a turbidity meter. Second clamps 9 with different specifications may be selected to fix second observation devices 10 with different specifications. A rubber pad is provided in the second clamp 9 to protect the second observation device 10 and increase a friction force. Since the second observation device 10 is located inside the frame 21, an equipment safety may be ensured. The frame 21 is connected with an acoustic releaser 12 through a chain 11, and handrails 14 are fixed on the frame. Specifically, the handrails 14 are welded to the inner sides of the stainless steel pipes for use by a rope during a release and a recovery. Counterweight lead blocks 13 and sacrificial anodes 18 are fixed on the frame through third clamps 17, and the sacrificial anodes play an anti-corrosion role. The chain 11 in this embodiment is a stainless steel chain 11 with a length of more than 5 m. The chain 11 is connected with the acoustic releaser 12, so that the acoustic releaser 12 is externally arranged, thus preventing a released floating ball from not floating out of the water after the releaser works. After the acoustic releaser 12 receives a release signal from the water surface, a release float 12 may be pushed out of the releaser and may float up to the sea surface with the ropte, so that the seabed base may be reclaimed smoothly. The acoustic releaser 12 in this embodiment has been produced and applied by Qingdao Tigerfish Offshore Equipment Co., Ltd. in 2019.

Among them, a bottom of the first observation device 1 is provided with a third rubber ring 16 to prevent the bottom of the first observation device 1 from scratching the cover body 23. The first observation device 1 in this embodiment is an acoustic doppler current profiler (ADCP).

This embodiment also provides a releasing method of the automatic stable posture seabed base, including following steps:

S1: selecting the plugging members 3 according to the releasing depth, and completing an assembly of the automatic stable posture seabed base; selecting the threaded plugs as the plugging members 3 when the releasing depth is ≤30 m, and selecting the permeable plugs as the plugging members 3 when the releasing depth is >30 m. The assembly is as follows.

The cover body 23 is unscrewed, split in two, and the first hemispherical cover 231 is taken out, while the second hemispherical cover 232 remains in the frame 21. The buoyancy body 4 is fixed on an outer side of the transducer 5 of the first observation device after setting working parameters of the first observation device, and the buoyancy body 4 is fastened on an outer side wall of the transducer 5 of the first observation device by using the first clamp 42, and the buoyancy body 4 is located on the upper part of the first observation device. The third rubber ring 16 is wrapped around the bottom of the first observation device, and then the first observation device is placed in the second hemispherical cover 232, and the first hemispherical cover 231 is covered and screwed, so that the cover body 23 remains closed. Positions of the support pads 224 of the limiters 22 of the frame 21 are adjusted, and the cover body 23 is kept in the center of the frame 21 until the support pads 224 are closely attached to the cover body 23, so as to firmly fix the cover body 23 in the center of the frame 21. The specification of the second clamp 9 is selected according to a diameter of the second observation device 10, the second clamp 9 is opened, and the second observation device 10 is fixed to the second clamp 9. Then, the second clamp 9 is screwed to the mounting bar 8. The counterweight lead blocks 13 and the sacrificial anodes 18 are respectively fixed on the stainless steel pipes of the hexahedral frame 21 by the third clamps. One end of the stainless steel chain 11 is connected to the acoustic releaser 12, and the other end is connected to the frame 21. The plugging members 3 selected according to a depth requirement are plugged into the first through holes 235.

S2: selecting a releasing mode for releasing into the sea.

There are two situations when the rope is selected for the releasing into the sea.

When the releasing depth is ≤30 m, the first observation device is placed in the cover body, and the threaded plug at the lower first through hole 235 is tightened, and seawater or fresh water is injected into the cover body 23 through the upper first through hole 235 until the inner cavity 236 is filled with water. Then, chlorine tablets are put in to prevent living things from adhering to a surface of the device transducer 5 during observation. It is required that there is no air bubble in the inner cavity 236. Specifically, the threaded plug at the upper first through hole 235 is tightened, and whether there are air bubbles in the cover body 23 is checked. If there are air bubbles, the threaded plug at the upper first through hole 235 needed to be unscrewed, and water is replenished until there is no air bubble in the cover body 23 after tightening the threaded plug at the upper first through hole 235. After the inner cavity 236 is filled with water, the first observation device in the inner cavity 236 may float in the cover body 23 under the buoyancy of a buoyancy member.

Then, the rope is connected through the handrails 14 or the frame, the automatic stable posture seabed base is moved to either outside of a ship, the rope is slowly released, the frame part and the acoustic releaser 12 are released at the same time, and the automatic stable posture seabed base descends to the seabed under a gravity of the frame 21 and the counterweight lead blocks 13. When the automatic stable posture seabed base descends to the seabed, a tension of the rope may decrease instantly, and then the rope is retracted to complete the releasing. Because the outer side of the transducer 5 is wrapped with the buoyancy member, an end of the transducer 5 may always be vertical to the sea surface under an action of the buoyancy member. Moreover, due to a blocking effect of the cover body 23 and an arrangement of the threaded plugs, the water inside and outside the cover body 23 has no circulation, and the seawater inside the cover body 23 basically maintains a static state, so that the posture of the first observation device in the cover body 23 always keeps the transducer 5 vertical to the sea surface, thus ensuring a high-quality acquisition of ocean current data.

When the releasing depth is >30 m, the first observation device is placed in the cover body, and the permeable plugs are screwed into all the first through holes 235. The rope is connected through the handrails 14 or the frame, the automatic stable posture seabed base is moved to either outside of the ship, and the rope is slowly released, so that the frame part of the automatic stable posture seabed base descends and is slowly put into the water. After the seawater submerges the inner cavity 236 and stays for a while, the seawater enters the inner cavity 236 through the liquid passing holes 35 and the grooves 34 of the permeable plugs. After the inner cavity 236 is filled with water, the rope is slowly loosed, and at the same time, the acoustic releaser 12 is released, until the tension of the rope decreases instantly after the automatic stable posture seabed base lands on the seabed, and then the rope is retracted to complete the releasing. Because the outer side of the transducer 5 is wrapped with the buoyancy member, the end of the transducer 5 may always be kept perpendicular to the sea surface under the action of the buoyancy member. Moreover, due to the blocking effect of the cover body 23 and the arrangement of the permeable plugs, water pressures inside and outside the cover body 23 may be kept consistent, and an entry of silt and microorganisms may be blocked. A fluidity of the seawater in the cover body 23 is little affected by an external ocean current, and the seawater in the cover body 23 basically maintains the static state, so that the posture of the first observation device in the cover body 23 always keeps the transducer 5 vertically to the sea surface, thus ensuring the high-quality acquisition of ocean current data.

When the seabed base is released at high tide or low tide, when the ocean current is weak, it is suitable to adopt a method of throwing the seabed base into the sea. There are two situations when throwing and releasing the seabed base into the sea.

The threaded plug located at the lower first through hole 235 is screwed when the releasing depth is ≤30 m, and the seawater or fresh water is injected into the net cover body 23 through the upper first through hole 235 until the inner cavity 236 is filled with the seawater. Then, the chlorine tablets are put in, and it is required that no bubbles exist in the inner cavity 236. The automatic stable posture seabed base is moved to the outside of the rails of the ship, and then the frame part and the acoustic releaser 12 are pushed into the sea at the same time, so that the automatic stable posture seabed base falls to the seabed under the action of gravity, and the releasing is completed.

The permeable plugs are screwed into all the first through holes 235 when the releasing depth is >30 m. The rope is connected through the handrails 14 or the frame, the automatic stable posture seabed base is moved to either outside of the ship, and the rope is slowly released, so that the frame part of the automatic stable posture seabed base descends and is slowly put into the water. After the seawater submerges the inner cavity 236 and stays for a while, the seawater enters the inner cavity 236 through the liquid passing holes 35 and the grooves 34 of the permeable plugs. After the inner cavity 236 is filled with the water, the rope is loosed, and the acoustic releaser 12 is released at the same time, so that the automatic stable posture seabed base falls to the seabed under the action of gravity, and the releasing is completed.

Through a setting of the automatic stable posture seabed base, the requirements for sea conditions and tide time are low during the releasing, and the automatic stable posture seabed base may be released under bad sea conditions. The conventional seabed base generally needs to be released at high flat tide or low flat tide. The automatic stable posture seabed base may be released without considering the influence of tide time because of an automatic recovery of the posture, thus saving an investigation duration.

Since the posture of the automatic stable posture seabed base does not need to be taken into account, the seabed base may be towed and released by the rope or thrown from the ship, so the problems that the ship needs to be equipped with a high-powered crane in general seabed base releasing, and the seabed base needs to be lowered slowly all the time are solved. Therefore, the requirements for releasing ships are reduced, and a workload of seabed base releasing personnel is also reduced.

No matter what posture the automatic stable posture seabed base lands on the seabed surface, the end of the transducer 5 of the core first observation device (ADCP or AWAC) of the automatic stable posture seabed base always keeps vertically to the sea surface, thus solving the problem that the conventional seabed base may not acquire data or a data quality is poor because the foundation may not be placed stably. Therefore, this automatic stable posture seabed base ensures the data acquisition quality.

When the automatic stable posture seabed base is used in shallow sea, the cover body 23 is filled with water before being put in, and the first through holes 235 are sealed by the threaded plugs, so that the seawater in the cover body 23 does not circulate with the outside world, and the seawater in the cover body 23 is in the static state, which is favorable for the first observation device 1 in the cover body 23 to maintain a stable posture, and the first observation device 1 in the cover body 23 is not easy to have a biological attachment. When the automatic stable posture seabed base is used in the deep sea, the first through holes 235 are sealed by the permeable plugs. After the automatic stable posture seabed base is lowered to the seabed, the permeable plugs may keep the seawater inside and outside the cover body 23 circulating, and there is no pressure difference between inside and outside. The size of each permeable plug is small, a mobility of the seawater in the cover body 23 is less affected by external disturbance, and the sponges 6 are attached to the permeable plugs, so sediment and microorganisms are blocked from entering the cover body.

The safety of the first observation device (ADCP or AWAC) may be effectively protected by placing the first observation device in the cover body 23.

The cover body 23 is located in the accommodating body 2 composed of stainless steel, so the cover body 23 is effectively protected.

The above embodiments are only used to illustrate the technical scheme of the application, but not to limit it. Although the application has been described in detail with reference to the foregoing embodiments, it should be understood by those of ordinary skill in the art that they may still modify technical solutions described in the previous embodiments, or equivalently replace some of the technical features; these modifications or substitutions do not make an essence of the corresponding technical solutions deviate from the spirit and scope of the technical solutions of various embodiments of the application.

What is claimed is:

1. An automatic stable posture seabed base, comprising:
   an accommodating body with an inner cavity for accommodating a first observation device and a seawater, wherein the accommodating body has first through holes for the seawater to enter and outflow the inner cavity;
   wherein the accommodating body comprises:
   a frame, wherein the frame has a plurality of scalable and adjustable limiters;
   a cover body limited and fixed in the frame by the plurality of limiters, wherein an interior of the cover body is provided with the inner cavity, and side walls of the cover body have the first through holes;
   plugging members blocked at the first through holes to close or semi-close the first through holes; and
   a buoyancy body installed at a transducer of the first observation device, wherein a buoyancy of the buoyancy body is larger than a mass of the first observation device, so the first observation device may float in the cover body after the cover body is filled with water, and a posture of the transducer in the cover body always keeps vertically to a sea surface.

2. The automatic stable posture seabed base according to claim 1, wherein:
   the buoyancy body comprises two floating rings, and the two floating rings encircle an outer side wall of the transducer and are located at an upper part of the first observation device, and are fixed to the transducer by a first clamp.

3. The automatic stable posture seabed base according to claim 1, wherein:
   the plugging members are threaded plugs or permeable plugs, and the first through holes are threaded holes matched with the plugging members.

4. The automatic stable posture seabed base according to claim 3, wherein:
   each permeable plug comprises a plug cap and a plug body;
   an outer side of each plug body has a first external thread, and each plug cap is screwed to each plug body through each first external thread;
   each plug body is screwed to each first through hole through each first external thread;
   each plug body has a groove, and a side of each plug body with a distance from each plug cap and each plug cap are provided with at least one liquid passing hole; and each liquid passing hole is connected with each groove; and
   a sponge is arranged in each groove.

5. The automatic stable posture seabed base according to claim 1, wherein:
   the cover body comprises a first hemispherical cover and a second hemispherical cover;
   an opening of the first hemispherical cover has a second external thread, and an opening of the second hemispherical cover has a first internal thread, and the first hemispherical cover and the second hemispherical cover are screwed into a sphere through the first internal thread and the second external thread;
   a first rubber ring is arranged between the first hemispherical cover and the second hemispherical cover, and the first rubber ring is sleeved on an outer side of the second external thread;
   a diameter of the cover body is 1.2-1.4 times a length of the first observation device; and
   the first hemispherical cover and the second hemispherical cover are both provided with at least one first through hole.

6. The automatic stable posture seabed base according to claim 1, wherein:
   the frame is polyhedral, and a limiter is fixed at an inner side of each vertex of the frame, and the limiters are arranged along diagonal directions of the frame;
   each limiter comprises a first rod, a second rod, a threaded sleeve, a support pad, and a gasket;
   one end of each first rod is fixed on an inner side of each apex of the frame, and an other end of each first rod has a third external thread;
   one end of each second rod is screwed to each support pad, and an other end of each second rod has a fourth external thread;
   each third external thread is opposite to a thread direction of each fourth external thread;
   two inner ends of each threaded sleeve have second internal threads respectively screwed with each third external thread and each fourth external thread, and each first rod and each second rod are connected by each threaded sleeve; and
   an inner side of each support pad is a concave spherical surface, and each gasket is attached to an edge of each concave spherical surface.

7. The automatic stable posture seabed base according to claim 6, wherein:
   at least one mounting bar is fixed on an inner side of the frame, and a second clamp is screwed on the mounting bar, and a second observation device is fixed in the second clamp;
   the frame is connected with an acoustic releaser through a chain; and
   handrails are fixed on the frame, and counterweight lead blocks and sacrificial anodes are fixed on the frame through third clamps.

8. The automatic stable posture seabed base according to claim 7, wherein:
   second rubber rings are arranged between the plugging members and the first through holes, and the plugging members are made of acrylic or stainless steel;
   a bottom of the first observation device is provided with a third rubber ring, and the first observation device is an acoustic doppler current profiler or an acoustic wave and current;
   each support pad is made of metal, and the cover body is made of acrylic; and the second observation device is one or more of a temperature and salt depth meter, a tidal level meter and a turbidity meter.

* * * * *